United States Patent
Clark et al.

(10) Patent No.: US 10,552,538 B2
(45) Date of Patent: *Feb. 4, 2020

(54) VALIDATING TOPICAL RELEVANCY OF DATA IN UNSTRUCTURED TEXT, RELATIVE TO QUESTIONS POSED

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 14/864,391

(22) Filed: Sep. 24, 2015

(65) Prior Publication Data
US 2016/0179784 A1 Jun. 23, 2016

Related U.S. Application Data

(63) Continuation of application No. 14/575,283, filed on Dec. 18, 2014, now Pat. No. 10,380,246.

(51) Int. Cl.
*G06F 17/27* (2006.01)
*G06N 20/00* (2019.01)
*G06F 17/21* (2006.01)

(52) U.S. Cl.
CPC ............ *G06F 17/277* (2013.01); *G06F 17/21* (2013.01); *G06F 17/279* (2013.01); *G06F 17/2735* (2013.01); *G06F 17/2785* (2013.01); *G06N 20/00* (2019.01)

(58) Field of Classification Search
CPC .. G06F 2216/03; G06F 17/3053; G06F 17/21; G06F 17/2735; G06F 17/277; G06F 17/2785; G06F 17/279; G06N 99/005; G06N 20/00
See application file for complete search history.

(56) References Cited

U.S. PATENT DOCUMENTS

| | | | |
|---|---|---|---|
| 8,024,173 B1 * | 9/2011 | Kinder | G06F 17/274 704/1 |
| 8,600,986 B2 | 12/2013 | Fan et al. | |
| 8,612,261 B1 * | 12/2013 | Swanson | G06F 19/3418 705/3 |
| 9,626,629 B2 * | 4/2017 | Vijayaraghavan | G06N 5/025 |
| 2007/0067293 A1 | 3/2007 | Yu | |

(Continued)

OTHER PUBLICATIONS

IBM "List of IBM Patents or Patent Applications Treated as Related".

*Primary Examiner* — Walter Yehl
(74) *Attorney, Agent, or Firm* — Patterson + Sheridan, LLP

(57) ABSTRACT

Techniques disclose validating user-provided text feedback for topical relevance relative to a question asked. A form with at least a first field is received. The first field includes unstructured text content provided as feedback in response to a question. The unstructured text content of the first field is evaluated to identify an answer type. A measure of relevance of the unstructured text content relative to the question is determined based on the evaluation.

7 Claims, 5 Drawing Sheets

(56) References Cited

U.S. PATENT DOCUMENTS

| | | | |
|---|---|---|---|
| 2009/0306967 A1* | 12/2009 | Nicolov | G06F 17/2785 704/9 |
| 2011/0078192 A1* | 3/2011 | Murdock, IV | G06F 16/3329 707/780 |
| 2012/0078890 A1* | 3/2012 | Fan | G09B 7/00 707/723 |
| 2013/0006610 A1* | 1/2013 | Quadracci | G06F 17/218 704/9 |
| 2013/0166457 A1* | 6/2013 | Du | G06Q 30/01 705/304 |
| 2013/0344468 A1* | 12/2013 | Lindsay | G06Q 30/0201 434/322 |
| 2014/0122504 A1* | 5/2014 | Courtier-Dutton | G06F 16/48 707/748 |
| 2014/0129492 A1* | 5/2014 | Petri | G06N 20/00 706/12 |
| 2014/0316856 A1* | 10/2014 | Williams | G06Q 30/02 705/7.32 |
| 2015/0206156 A1* | 7/2015 | Tryfon | G06Q 30/0203 705/7.32 |

\* cited by examiner

Browser 300

5. Front Desk Staff
Please rate the quality of service of the front desk staff (0 = Terrible, 5 = Excellent)

○ 0   ○ 1   ○ 2   ● 3   ○ 4   ○ 5

Please explain your rating below:

[ The staff was courteous and polite. But sometimes they would be unresponsive to some of my requests. I would have to call the front desk too often before they took care of my issues.| ] ← $305_1$ Prev Next

Browser 300

5. Front Desk Staff
Please rate the quality of service of the front desk staff (0 = Terrible, 5 = Excellent)

○ 0   ○ 1   ○ 2   ● 3   ○ 4   ○ 5

Please explain your rating below:

[ printer out of crayons| ] ← $305_2$

Prev Next

VALIDATING TOPICAL RELEVANCY OF DATA IN UNSTRUCTURED TEXT, RELATIVE TO QUESTIONS POSED

CROSS-REFERENCE TO RELATED APPLICATIONS

This application is a continuation of co-pending U.S. patent application Ser. No. 14/575,283, filed Dec. 18, 2014. The aforementioned related patent application is herein incorporated by reference in its entirety.

BACKGROUND

Embodiments presented herein generally relate to text analysis, and more specifically, to validating user-provided text feedback entered in response to a questionnaire (e.g., online form, survey, quiz, etc.).

Many companies solicit feedback from users (e.g., customers, clients, and the like) using online forms and surveys. Such surveys often ask users to provide descriptive information in response to a question in a text box. Text boxes provide users with considerable latitude for responding to the question, compared to other user interface elements, such as a check box or radio button. For example, a survey may prompt a user to comment about various topics of a customer service experience, such as staff politeness and effectiveness. The survey may ask the user to rate each topic based on performance, e.g., using a number scale. The survey may also allow the user to comment about the rating using a text box. Companies may read the user-provided feedback to determine areas that are excelling and areas that require improvement.

However, to be meaningful, the user-provided feedback should have at least some relevance to a question being posed. For example, a cable service exit survey may ask a user why the user is cancelling a cable television subscription. In some cases a user might not want to answer the question (e.g., due to inconvenience, lack of interest, etc.) but may be nonetheless required to answer the question to progress through the survey. In such a case, the user might enter irrelevant feedback (e.g., a random string of letters, non sequiturs, etc.). As a result, the cable company does not receive any useful information from the feedback. Further, in some cases, a high volume of surveys submitted to a company presents a challenge for obtaining useful information from surveys, particularly where a reviewer must wade through large numbers of irrelevant responses.

SUMMARY

One embodiment presented herein describes a method for validating user-provided feedback on a form. The method generally includes receiving a form with at least a first field, the first field for capturing unstructured text content provided as feedback in response to a question associated with the first field. The unstructured text content of the first field is evaluated to identify an answer type. A measure of relevance of the unstructured text content relative to the question is determined based on the evaluation.

BRIEF DESCRIPTION OF THE SEVERAL VIEWS OF THE DRAWINGS

FIGS. 3A and 3B illustrate an example question presented with a freeform text field in a web survey, according to one embodiment.

DETAILED DESCRIPTION

Figure 1:
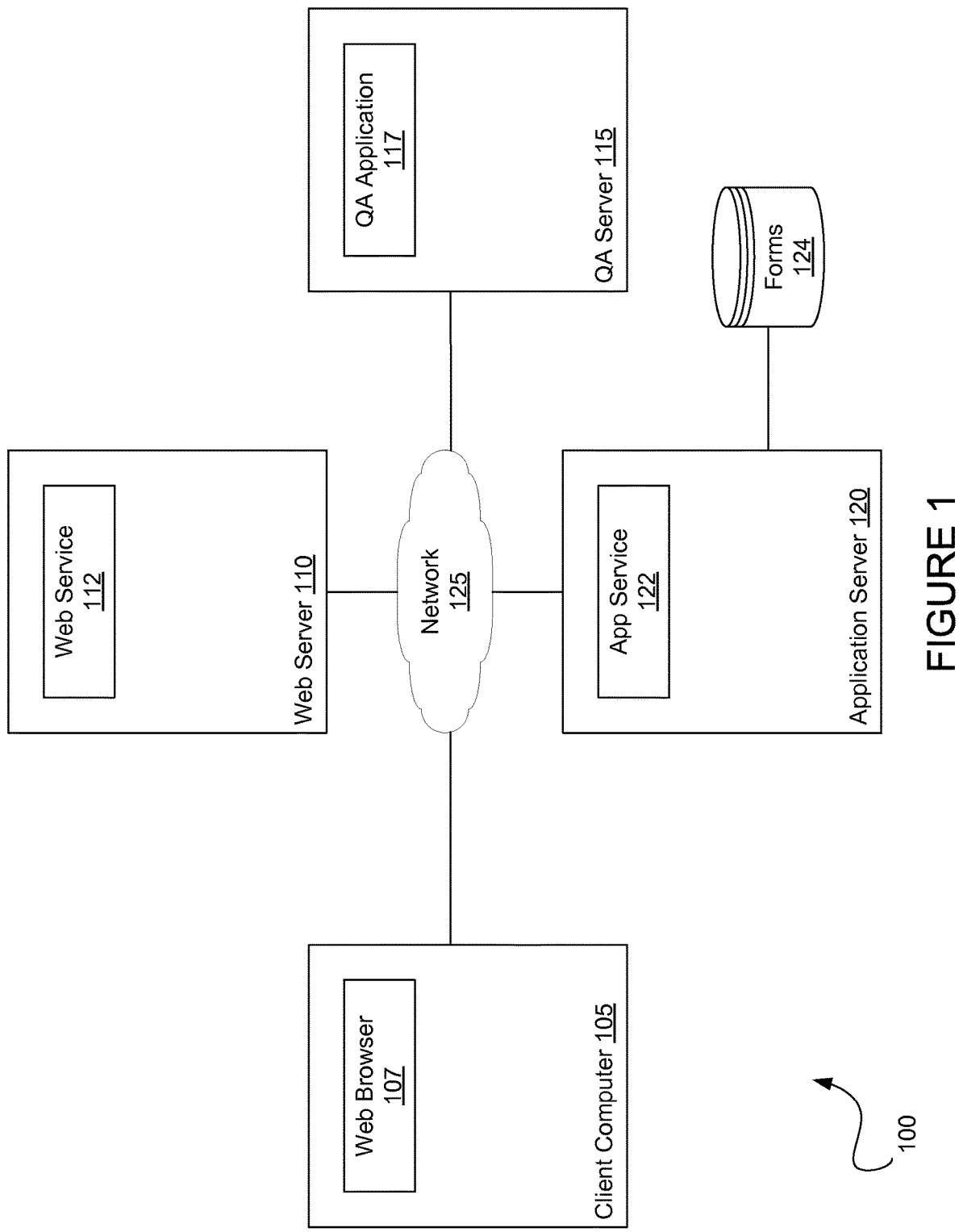
FIG. 1 illustrates an example computing environment, according to one embodiment.

Ideally, text feedback should be relevant to a question asked. Otherwise, feedback provided in an online form would be unable to ascertain any meaningful observations from it. For example, assume a hotel customer service questionnaire poses a question: "How was the hotel check-in process?" To be relevant, the feedback should address a check-in process of that hotel. Examples of relevant feedback are "The process went smoothly," and "Man at check-in was rude and inattentive." Whether positive or negative, the feedback being reviewed may nonetheless identify aspects in these examples related to the check-in process referred to by the question. Examples of irrelevant feedback include: "The taxi driver dropping me off told me his credit card machine was broken," and "enough with pants ok." The first example, while related to other aspects of a guest's experience, is unrelated to the hotel check-in process referred to by the question. The second example is completely unrelated to the question.

Embodiments presented herein describe techniques for vetting user-provided feedback on forms, based on context and semantics identified through natural language processing (NLP) and machine learning (ML) techniques. More specifically, embodiments provide a ML-based trained model for determining whether feedback provided to a given question in a form (e.g., a survey, questionnaire, quiz, etc.) is relevant to the question asked.

In one embodiment, a deep question answering (QA) system may ingest a form, such as a survey. The QA system builds the model by extracting unstructured text from the survey, such as questions, instructions, and other content. The application evaluates such content using NLP techniques such as lexical and semantic analysis to identify context about each question in the survey. The application can use such context to determine the subject matter of a question and what types of answers might be expected from the question (e.g., such as whether the question is asking for a name, a date, a reason, etc.). Further, the QA application can tune the trained model by providing a set of sample answers to each of the questions. The sample answers might be curated from reviews that are relevant and irrelevant to questions posed. The sample answers guide the trained model in determining what answers are relevant to a particular question and what answers are irrelevant.

The QA application can evaluate actual user-provided feedback is relevant to a given question. In one embodiment, the QA application extracts unstructured text content from text field provided by a customer in response to a question. The QA application evaluates the feedback to determine whether the feedback includes expected concepts, answer types, lexical answer types, and topics identified in the trained model. The application can determine a measure of relevance, e.g., by scoring the feedback based on how closely the feedback resembles a relevant answer. The application may use the score to determine whether the feedback is relevant to the question asked, e.g., by using a pass/fail threshold.

Advantageously, enterprises using online forms to provide surveys can use such techniques to ensure that feedback meets at least minimal standard of relevance. In cases where the feedback is predicted by the QA application to be unrelated, the user can subsequently be prompted to re-answer the associated question. As another example, in some cases, it is possible that a user might have answered a question based on a misunderstanding of the question, e.g., due to reading the question incorrectly. For example, the user might have answered a question such as "What is your mother's maiden name?" with a date, possibly interpreting the question as, "When is your mother's birthday?" Prompting the user to re-answer the question can effectively refocus the user to address the question properly.

Note, the following references online customer service surveys as an example of determining whether user-provided feedback is relevant to a question presented in an online form. However, one of skill in the art will recognize that embodiments may be adapted in various contexts related to evaluating user-provided text answers to a form. For example, embodiments may apply to online testing for an educational course. That is, an online test may be ingested by the QA server. The QA application evaluates sentences, topic headers, and the like in the quiz to identify contextual information and expected types of answers for each question. The QA application can build a model based on the identified context and training examples provided to the application of both relevant and irrelevant answers. A student might incorrectly read a question and provide an answer that is irrelevant to the question. The application may indicate to the student in response that the answer does not address the question, and in turn, the student can change the answer. Note, in this example the QA application identifies the answer for relevance, regardless of whether the answer is correct. For example, if the QA application determines that a given question needs a lexical answer type of a date, then answers that do not have this lexical answer type may be rejected.

FIG. 1 illustrates an example computing environment 100, according to one embodiment. As shown, the computing environment 100 includes a client computer 105, a web server 110, a deep question answering (QA) server 115, and an application server 120. The client computer 105 may be a physical system (e.g., a desktop, laptop computer, mobile device, etc.) or a virtual computing instance executing in the cloud. The client computer 105 includes a web browser 107. A user may access data services through the web browser 107 over a network 125 (e.g., the Internet).

For instance, a user may access a web service 112 executing on a web server 110. In one embodiment, the web service 112 provides a web interface for an application server 120 (e.g., executing an application service 122). More specifically, the application service 122 provides a database of online forms 124. The forms 124 include polls, surveys, and quizzes presented to users on the web browser 107. The forms 124 may be created by different organizations requesting user input on one or more topics. For example, a hotel company may create a customer service survey through the app service 122. In turn, the app service 122 may provide the survey to users through the web service 112. Customers of the hotel may be presented with the survey, e.g., through a link provided by the hotel company in an e-mail correspondence.

The hotel customer service survey may cover a variety of topics, such as politeness of front desk staff, cleanliness, availability of concierge staff, overall quality of a stay, etc. Further, the survey may provide questions prompting the user for a rating (e.g., on a numeric scale) or for a text-based response. In some cases, a user might provide irrelevant input to questions asking for text-based responses, which may be unhelpful to the hotel asking the question.

In one embodiment, the QA server 115 may validate user-provided responses for topical relevance. As shown, the QA server 115 further includes a QA application 117. A given form 124 may be ingested to the QA application 117. In turn, the QA application 117 receives the form 124. The QA application 117 then extracts unstructured text from the form, such as topic headers, questions, and answer prompts.

The QA application 117 may analyze the unstructured text and identify subject matter, expected answer types, lexical answer types, and the like, for the each question. The QA application 117 can obtain context based on the question itself as well as other parts of the survey. For example, the QA application 117 may identify further context from the name of a section where the question is located (e.g., a question that is part of a "Cleanliness" section of the survey may provide context). Further, the QA application 117 may identify a lexical answer type (LAT) for a particular question. For example, for a question such as "Who will you bring for your next stay?", the QA application 117 may identify that the LAT is a person, and thus the question is asking for a person (e.g., a name or a person noun) as an answer, as opposed to a date, location, or another irrelevant type of answer.

Further, the QA application 117 builds a machine learning (ML)-based model of expected concepts and answers from a training set of example answers for a given field in a form 124 that allows a user to provide an unstructured text response. The training set may include answers submitted to the form previously that have been deemed to be relevant or irrelevant to the question. Continuing the previous example of the "Who will you bring for your next stay?" question, sample relevant responses may be "wife," "my children," "Mary Ann," etc. Sample irrelevant responses may be "Dec. 11, 2015," "XYZ Hotel Los Angeles," "suitcase," and the like. Each of the responses may be labeled by a subject matter expert as either relevant or irrelevant (or scored based on a range of quality).

The QA application 117 builds a model from the training examples. The model may identify features in the examples and relate the features towards an outcome for response being either relevant or irrelevant. Weights for the impact of a presence (or absence) of the features are derived from this evaluation. The model can then take the features provided in the training examples and score the examples to predict whether the response is relevant or irrelevant. The score may indicate a measure of confidence of whether an answer is relevant to a question. The QA application 117 may identify scores exceeding a given threshold as being relevant and scores below the threshold as irrelevant.

In one embodiment, the app service 122 may send user-provided text answers to the QA application 117. In one embodiment, the QA application 117 can evaluate each text response based on the trained model to determine whether the text response is likely relevant or irrelevant to the question associated with the response. That is, the QA application 117 may determine whether the response matches an expected answer type (e.g., the identified LAT) as well as how the response measures with the previously evaluated set of answers. The QA application 117 may then determine a confidence score indicating the likelihood that the response is relevant to the question addressed.

The app service 122 can use the confidence score of a given response to determine whether further input is needed from the user (or whether to accept or reject the response altogether). For example, if the score is above a specified threshold, the app service 122 can determine that the user-provided response sufficiently answers the associated question and thus determine that no further action is needed. However, if the score is below the threshold, the app service 122 can prompt the user to re-answer the question. In one embodiment, the QA application 117 itself can make the relevance determination based on a threshold and forward the determination to the app service 122.

Figure 2:
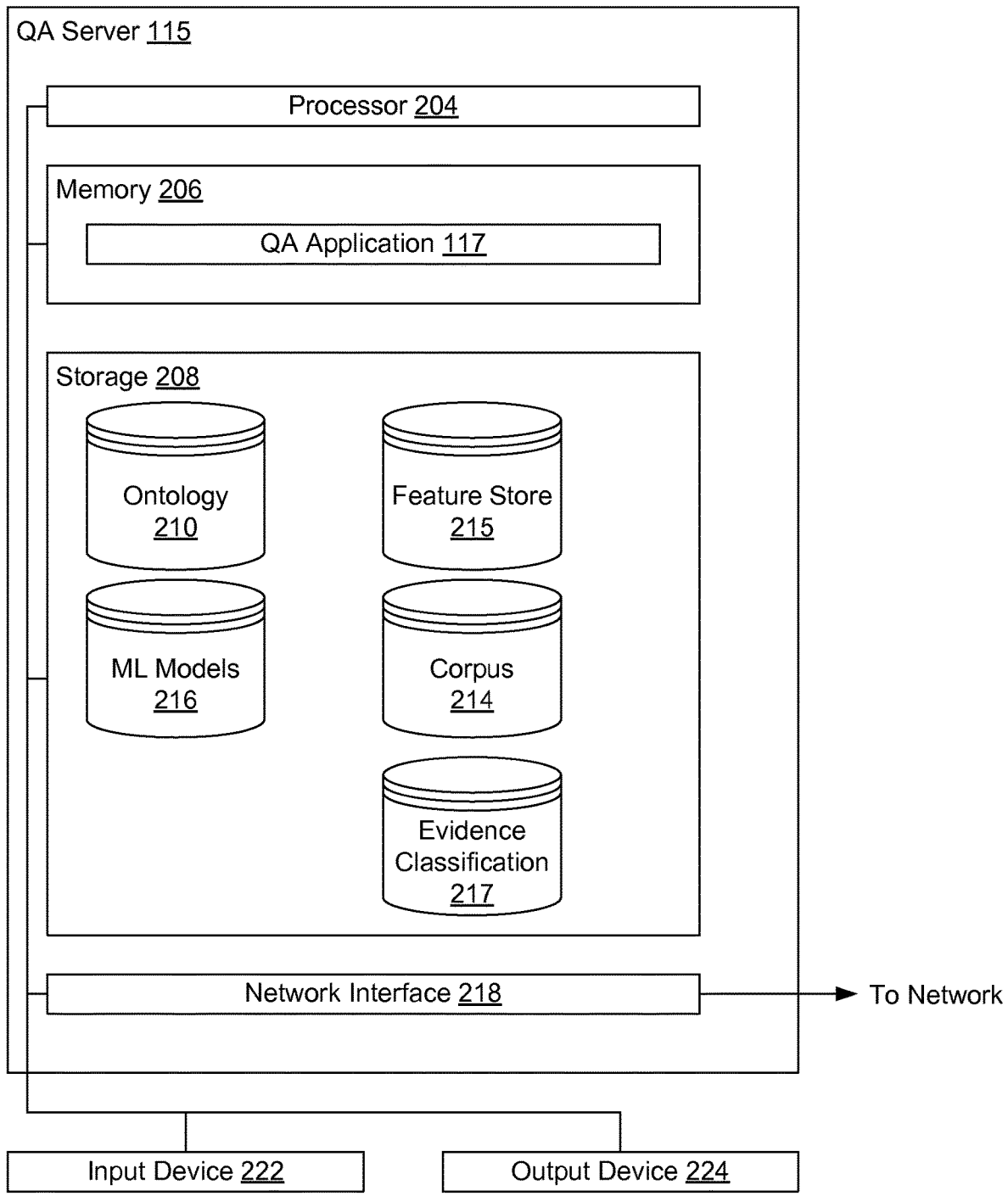
FIG. 2 further illustrates the deep question-and-answer system described relative to FIG. 1, according to one embodiment.

FIG. 2 further illustrates the QA server 115, according to one embodiment. The QA server 115 generally includes a processor 204 connected via a bus to a memory 206, a network interface device 218, a storage 208, an input device 222, and an output device 224. The QA server 115 is generally under the control of an operating system. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. Similarly, the memory 106 may be a random access memory. While the memory 206 is shown as a single identity, it should be understood that the memory 206 may comprise a plurality of modules, and that the memory 206 may exist at multiple levels, from high speed registers and caches to lower speed but larger DRAM chips. The network interface device 218 may be any type of network communications device allowing the navigation server 110 to communicate with other computers via the network 125.

The storage 208 may be a persistent storage device. Although the storage 208 is shown as a single unit, the storage 208 may be a combination of fixed and/or removable storage devices, such as fixed disc drives, solid state drives, removable memory cards, optical storage and network storage systems.

As shown, the memory 206 contains the QA application 117, which is an application generally configured to operate a deep question answering (QA) system. One example of a deep QA system is Watson, by the IBM Corporation of Armonk, N.Y. A user may submit a case (also referred to as a question) to the QA application 117, which will then provide an answer to the case based on an analysis of a corpus of information. In the present context, a case may correspond to a question provided in a form 124. The QA application 117 may execute a pipeline to generate a response to the case, which is returned to the user. The QA application 117 may further be configured to classify questions, identify features highly relevant to generating a correct response to the questions, and store the resulting relationships for later use.

As shown, storage 208 contains the ontology 210, corpus 214, feature store 215, ML models 216, and evidence classification 217. The ontology 210 provides a structural framework for organizing information. An ontology formally represents knowledge as a set of concepts within a domain, and the relationships between those concepts. The corpus 214 is a body of information used by the QA application 117 to generate answers to cases. For example, the corpus 214 may contain dictionary definitions and the forms 124. Feature store 215 stores a mapping between question context and features. If the features are not present in candidate answers for the question, processing of those candidate answers by the QA application 117 may be skipped to improve performance and efficiency. ML models 216 are models created by the QA application 117 during the training phase, which are used during a runtime pipeline to score and rank candidate answers to cases based on features previously generated for each answer. Evidence classification 217 stores relationships between evidence from the corpus 114, the question context, and the predictive features.

The input device 222 may provide a keyboard and/or a mouse, etc. The output device 224 may be any conventional display screen. Although shown separately from the input device 222, the output device 224 and input device 222 may be combined. For example, a display screen with an integrated touch-screen may be used.

FIGS. 3A and 3B illustrate examples of feedback provided in response to a question on an online survey, according to one embodiment. Illustratively, FIGS. 3A and 3B depict a browser 300 displaying a question of a hotel customer service survey. In particular, the question refers to the front desk staff, with a prompt, "Please rate the quality of service of the front desk staff (0=Terrible, 5=Excellent)." The survey provides a set of radio buttons numbered from 0 to 5, allowing the user to select one of the radio buttons. Further, the survey provides a text box following the prompt that allows the user to write a response to the prompt, "Please explain your rating below."

Context may be difficult to identify by only reading the prompt, "Please explain your rating below." However, the previous prompt "Please rate the quality of service of the front desk staff," as well as the topic "Front Desk Staff" provides context indicating that the text box prompt is asking for input about "front desk staff." The QA application 117 may ingest the form and evaluate topics, concepts, and subject matter identified in the form to determine expected concepts and answer types.

FIG. 3A depicts a response $305_1$ that includes relevant input to the prompt: "The staff was courteous and polite. But sometimes they would be unresponsive to some of my requests. I would have to call the front desk too often before they took care of my issues." The response $305_1$ appears to be topically relevant because the question is asking about front desk staff, and the response $305_1$ appears to address that. FIG. 3B depicts a response $305_2$ that includes irrelevant input to the prompt: "printer out of crayons." The response $305_2$ appears to be topically irrelevant because nothing in the response actually addresses any context of the question.

Figure 4:
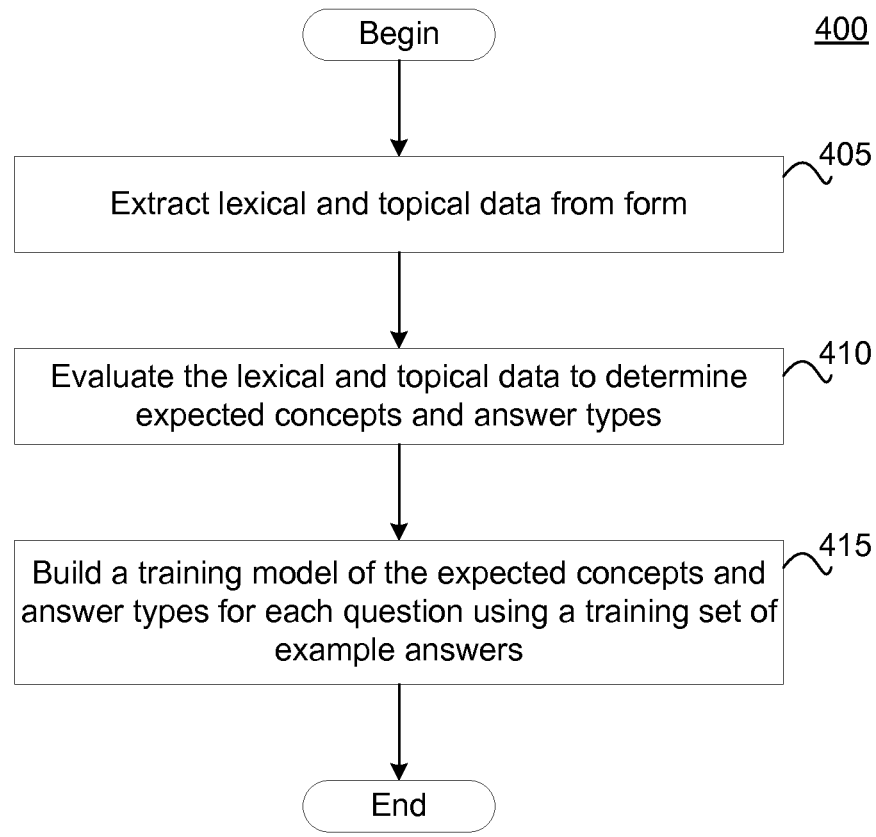
FIG. 4 illustrates a method for training a deep question-and-answer system to develop a model for validating user-provided answers in a freeform answer text box.

FIG. 4 illustrates a method 400 for building a trained model used to evaluate text feedback provided in response to questions on a form, according to one embodiment. Assume that the QA server 115 has ingested the hotel customer service survey depicted in FIGS. 3A and 3B. Method 400 begins at step 405, where the QA application 117 extracts lexical and topical data from the form. Specifically, the QA application 117 extracts unstructured text from the form, such as the form title, topic headers, questions, and other content (e.g., prompts, page numbers, text describing character requirements, etc.).

At step 410, the QA application 117 evaluates the lexical and topical data to determine expected concepts and answer types for each question in the form. The QA application may perform lexical and content analysis to identify interrogative words (e.g., who, what, when, where, how) and key terms (e.g, particular nouns, verbs, and phrases) for each question. Further, the QA application 117 may identify additional context for each question by analyzing words around the question.

For example, although the prompt associated with the text box depicted in FIGS. 3A and 3B merely states "Please explain your rating below," the QA application 117 can evaluate the previous prompt, "Please rate the quality of service of the front desk staff" and the topic header "Front desk staff" to identify "front desk staff" as a particular context for that prompt. Further, the QA application 117 can determine lexical answer types (LAT) based on a question provided. For example, if a question asked "Who did you bring with you on your stay?", the QA application 117 may identify that the question is asking for an answer that specifies a person, whether the person be a person noun ("mother," "friend," "son") or the name of a person ("Dan," "Mary," "Leslie").

At step 415, the QA application 117 builds a trained model of the expected concepts and answer types for each question. Specifically, the QA application 117 may evaluate the accuracy of the identified expected concepts and answer types using a set of example responses confirmed to be either relevant or irrelevant. Continuing the previous example of the "Please explain your rating below" prompt, assume that relevant answers submitted include "They were nice," "the front desk was excellent," and "the staff was impatient." And irrelevant answers submitted include "jjjjfjffbbb", "room service took too long", and "concierge was very knowledgeable." The QA application 117 may score the each of the answers based on how closely the relevant and irrelevant answers match the expected concepts and answer types.

Figure 5:
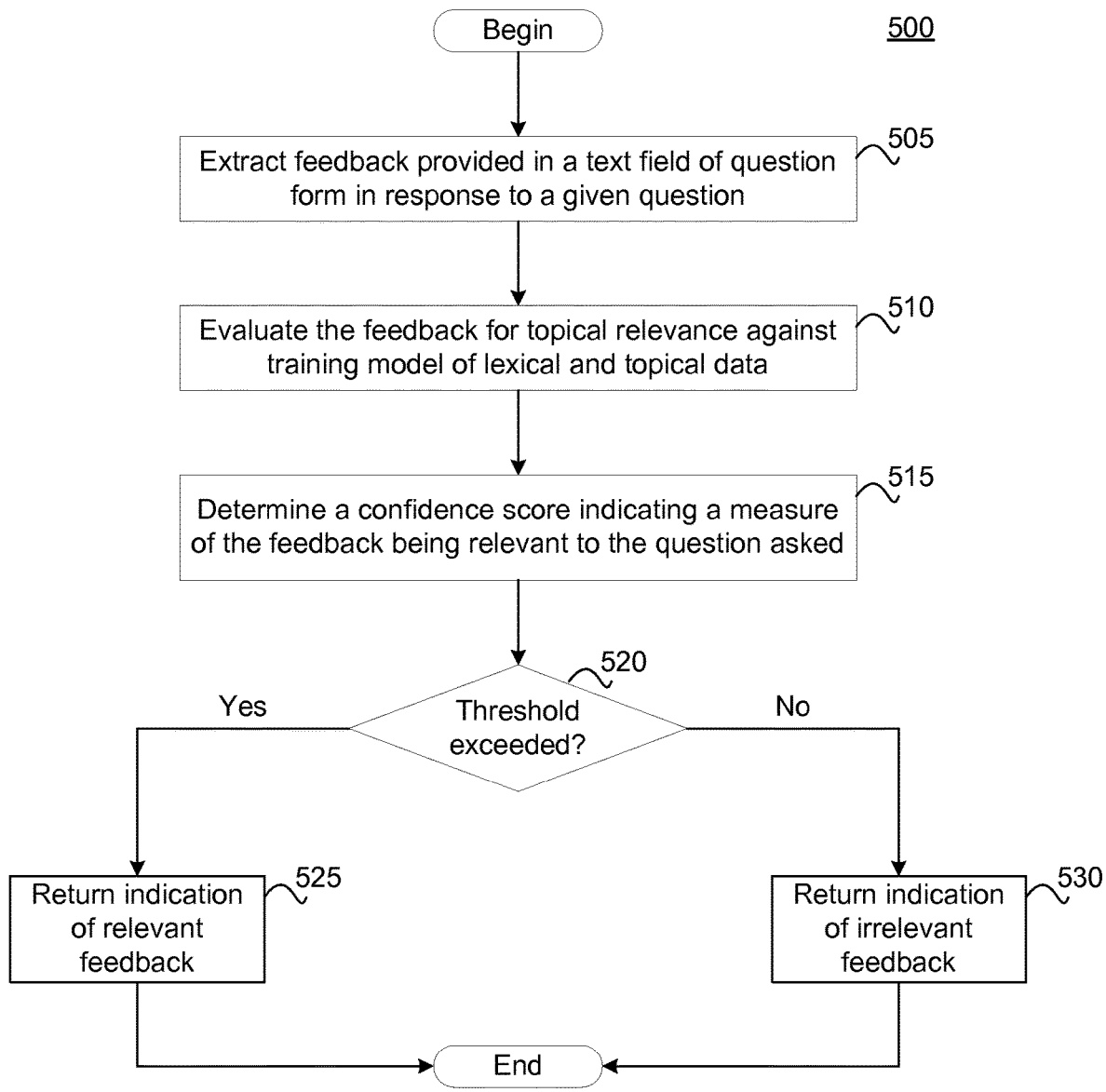
FIG. 5 illustrates a method for validating user-provided answers in a freeform answer text box.

FIG. 5 illustrates a method 500 for evaluating text feedback provided in response to a question on a form, according to one embodiment. Assume that a user has provided feedback to the hotel customer service survey question described in FIGS. 3A and 3B. The app service 122 may forward the feedback to the QA application 117. Method 500 begins at step 505, where the QA application 117 extracts unstructured text of the feedback. The feedback is provided in response to a given question. For example, assume that the feedback is "The front desk staff was very helpful."

At step 510, the QA application 117 evaluates the feedback. The QA application 117 may analyze the feedback using NLP techniques (e.g., lexical analysis, semantic analysis, etc) to identify sentence structure and key terms of the feedback. The QA application 117 can then evaluate the feedback against the trained model. In particular, the QA application 117 determines whether the feedback matches the expected answer types and concepts identified for that question. Continuing the hotel customer service example, an expected concept for the associated question is "front desk staff." Because the feedback discusses the front desk staff, the QA application 117 may determine that the feedback includes the expected concept. Further, the QA application 117 evaluates the feedback against previously analyzed answers provided in the example set of responses.

At step 515, the QA application 117 determines a confidence score based on the collective results of the feedback evaluation. The score may indicate a measure of the feedback being relevant to addressing the question. In one embodiment, the QA application 117 may specify a relevance threshold, where scores exceeding the threshold are relevant and scores that do not are irrelevant. At step 520, the QA application 117 determines whether the confidence score exceeds the threshold. For example, depending on the score, the QA application 117 can determine whether to forward the feedback to a reviewer (or reject the feedback and prompt the user to provide another response).

If the score exceeds the threshold, the QA application 117 returns an indication of relevant feedback to the app service 122 (at step 525). However, if the score does not exceed the threshold, the QA application 117 returns an indication of irrelevant feedback to the app service 122. The app service 122 may determine, based on the indication, whether to prompt the user to re-answer the question so that the feedback includes more topical relevance. Such a case may be important for some surveys where the party requesting feedback from customers wants a minimum quality of feedback. In such cases, the app service 122 may be configured to block the user from proceeding until the user provides a sufficient answer to the question before allowing a user to proceed (e.g., in surveys where a user wishes to cancel a service).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., QA application 117) or related data available in the cloud. For example, the QA application 117 could execute on a computing system in the cloud and analyze text of form content. In such a case, the QA application 117 could to identify expected content and answer types for questions in the form and store generated machine learning models at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for validating user-provided feedback from a client on an electronic form, the method comprising:
    receiving, via a processor, an electronic form comprising unstructured text, the unstructured text including at least (i) a first section containing a question and (ii) a first field containing content provided as feedback in response to the question;
    extracting the unstructured text from the electronic form;
    identifying, from the unstructured text, a context for the question included in the first section, based on a natural language analysis of the question included in the first section;
    determining expected concepts and answer types for the question included in the first section, based on lexical and topical data extracted from the unstructured text;
    performing a lexical and content analysis of the content of the first field to identify interrogative words and key terms within the content;
    training a machine-learning data model using a plurality of form submissions for the form, comprising:
        extracting, from each of the plurality of form submissions, a respective portion of unstructured text;
        analyzing the portions of unstructured text using the natural language analysis to determine a subject matter of a question in the form and expected answers for the question; and
        tuning the machine-learning data model based on a set of sample answers to the form;
    calculating a score indicating how closely the content of the first field resembles a relevant answer to the question included in the first section, by processing data associated with the unstructured text using the trained machine-learning data model, wherein the trained machine-learning data model evaluates an extent to which the content of the first field includes expected concepts, answer types, lexical answer types, and topics relating to the question included in the first section;
    classifying the electronic form into a first category of a plurality of predefined categories, based on the calculated score not exceeding a predefined threshold; and
    returning the classification of the electronic form to an application service executing on an application server, wherein the application service is configured to, upon receiving the classification, dynamically control a graphical user interface through which the user-provided feedback was received to block the client from proceeding and to prompt for re-entry of the user-provided feedback.

2. The method of claim 1, further comprising:
    upon determining that the measure of relevance exceeds a specified threshold, accepting the feedback as relevant to the question.

3. The method of claim 1, further comprising:
    upon determining that the measure of relevance does not exceed a specified threshold, rejecting the feedback; and
    generating a prompt requesting new feedback responsive to the question.

4. The method of claim 1, wherein the measure of relevance is determined based on an expected answer type associated with the question.

5. The method of claim 4, wherein the expected answer type is identified based on lexical and contextual data extracted from the form.

6. The method of claim 5, wherein the expected answer type is further determined using natural language processing techniques on the lexical and contextual data extracted from the form.

7. The method of claim 1, further comprising:
    determining, based on the measure of relevance, whether to forward the feedback to a reviewer.

* * * * *